United States Patent [19]

Kusmer et al.

[11] Patent Number: 5,427,354

[45] Date of Patent: Jun. 27, 1995

[54] VALVE ASSEMBLY

[75] Inventors: Daniel P. Kusmer, Sugar Land; Robert A. Frenzel, Waller, both of Tex.

[73] Assignee: Keystone International Holdings Corp., Houston, Tex.

[21] Appl. No.: 253,963

[22] Filed: Jun. 3, 1994

[51] Int. Cl.⁶ .............................................. F16K 1/22
[52] U.S. Cl. ..................................... 251/316; 251/360
[58] Field of Search ..................... 251/316, 306, 360; 137/315

[56] References Cited

U.S. PATENT DOCUMENTS

| | | | |
|---|---|---|---|
| 3,656,714 | 4/1972 | Peterson | 251/360 |
| 4,106,751 | 8/1978 | Niskin | 251/316 |
| 4,560,142 | 12/1985 | Burton | 251/316 X |
| 4,575,046 | 3/1986 | Krause et al. | 251/316 |
| 4,645,180 | 2/1987 | Bregman et al. | 251/360 |
| 4,684,105 | 8/1987 | Haas, II | 251/316 X |
| 4,779,841 | 10/1988 | Pupillo et al. | 251/316 X |
| 4,836,500 | 6/1989 | Pupillo et al. | 251/316 X |

*Primary Examiner*—John C. Fox
*Attorney, Agent, or Firm*—Browning, Bushman, Anderson & Brookhart

[57] ABSTRACT

A valve comprising a valve body having a through opening that forms a fluid passage and having a wall surrounding a portion of the fluid passage, the wall defining a radially inwardly facing surface, the valve further including a valve element rotatably mounted in the valve body. To retain a valve seat in the valve body, there is provided a ring that has a peripheral surface shaped and sized such that the peripheral surface closely faces the radially inwardly facing surface of the wall when the ring is positioned within the through opening. The ring has a first axially facing side and a second axially facing side and a notch formed in the first side, the ring also having a second, radially outwardly facing annular groove in the peripheral surface that intersects the notch. When the ring is positioned within the through opening of the valve body, the first and second annular grooves are in register and thereby define an annular channel. A wire member having a first end and a second end has its first end removably fixed in the first annular groove such that, when the notch on the ring is in register with the fixed first end, rotation of the ring relative to the valve body in a direction away from the first end of the wire member and along the length of the wire member toward the second end threads the wire member into the channel.

12 Claims, 3 Drawing Sheets

_5,427,354_

VALVE ASSEMBLY

BACKGROUND OF THE INVENTION

The present invention relates to a valve having a rotatable valve element and, more particularly, to a valve having an assembly for retaining the valve seat in the valve body.

DESCRIPTION OF THE PRIOR ART

Valves having rotatable valve elements-e.g., butterfly valves—are well known. In certain types of butterfly valves, the valve seat is axially insertable and removable axially from the valve body through an opening in the valve body that partially defines the fluid flow passageway through the valve. In such valves, a retainer ring or insert is used to hold the valve seat in the valve body. Examples of prior art seat retaining arrangements used on butterfly valves of the type described above are shown in U.S. Pat. Nos. 4,399,833 and 4,575,048.

In valves of the type under consideration—i.e., wherein the valve seat is insertable and removable axially—it is important that the seat retainer be capable of holding the seat in place under line pressure. Additionally, it is desirable that the seat retainer assembly be such that the seat can be easily and quickly removed and replaced, if necessary, in the field.

SUMMARY OF THE INVENTION

It is therefore an object of the present invention to provide a valve having an improved assembly for retaining the valve seat in the valve body.

Another object of the present invention is to provide an assembly for retaining the valve seat of a butterfly valve in a valve body and that permits quick and easy replacement of the valve seat.

The above and other objects of the present invention will become apparent from the drawings, the description given herein, and the appended claims.

The valve of the present invention comprises a valve body having a through opening that forms a fluid flow passage. A wall surrounds a portion of the fluid flow passage and defines a radially inwardly facing surface. A valve element is rotatably mounted in the valve body to control flow of fluid through the valve. A retainer ring or insert is received in the valve body. The ring has a peripheral surface shaped and sized such that when the ring is received in the valve body, it closely faces the radially inwardly facing surface of the wall. The ring has a first, axially facing side and a second, axially facing side, a notch being formed in the first side. The ring also includes a second, radially outwardly facing annular groove in the peripheral surface, the second, annular groove intersecting the notch. The first and second annular grooves are substantially in register when the ring is positioned in the valve body such that the first and second grooves define an annular channel. A wire member having a first end and a second end holds the ring in the valve body. To this end, there are means to fix the first end in the first annular groove such that when the ring is received in the valve body and the notch on the ring is in register with the means to fix the first end and the first end is fixed in the first annular groove, the wire member is threaded into the annular channel as the ring is rotated relative to the valve body in a direction away from the first end of the wire and along its length toward the second end.

DESCRIPTION OF THE PREFERRED EMBODIMENT

While the present invention will be described with particular reference to a wafer valve—e.g., a butterfly valve—it is be understood that the valve of the present invention can comprise any quarter-turn valve having a rotatable valve element wherein the valve seat, which is engaged by the valve element to effect sealing, is insertable and removable from the valve body axially—i.e., along the flow path through the valve.

Figure 1:
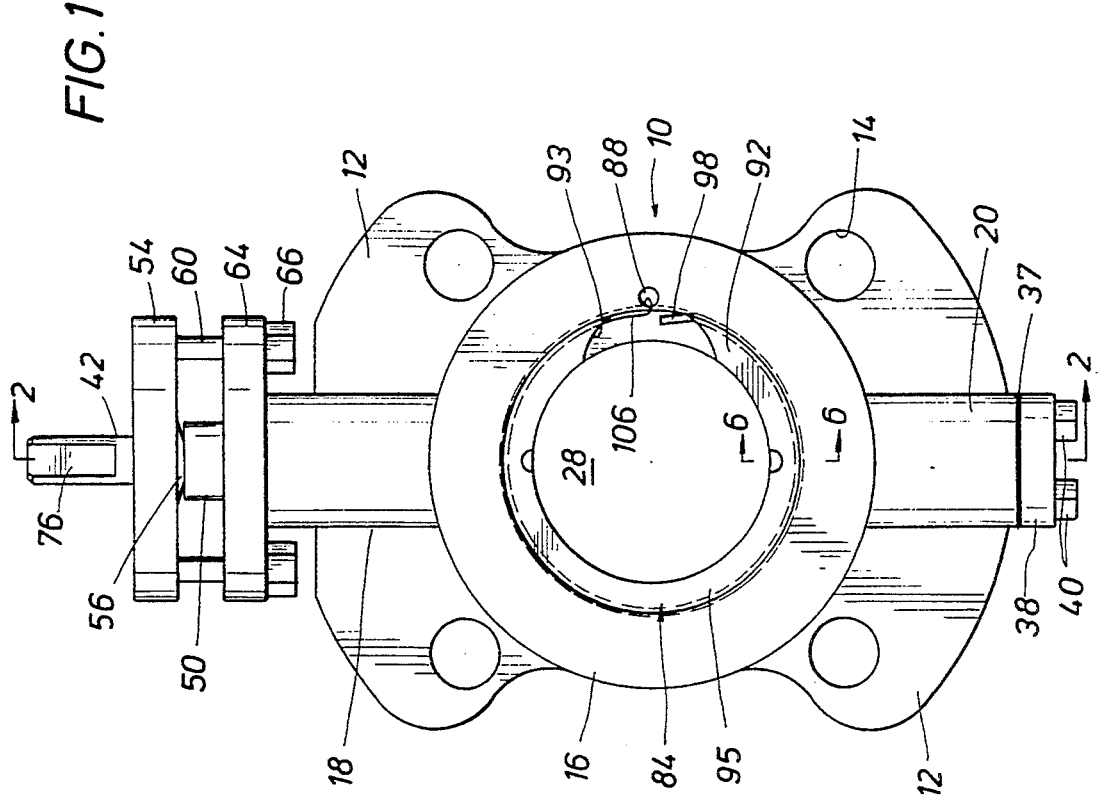
FIG. 1 is a front, elevational view of the valve of the present invention.
Figure 2:
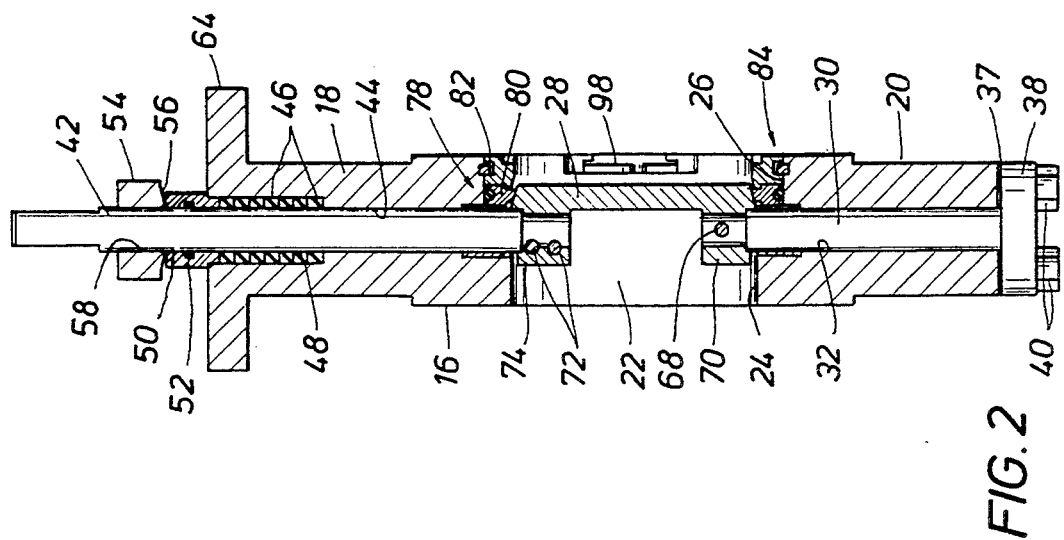
FIG. 2 is a cross-sectional view taken along the lines 2—2 of FIG. 1.

In reference first to FIGS. 1 and 2, the valve of the present invention comprises a valve body 10 optionally provided, as shown, with laterally outwardly projecting ears 12 disposed around the periphery of valve body 10 and having bolt holes 14 for permitting the valve to be connected to adjoining pipe flanges. Valve body 10 comprises a central cylindrical section 16 from which project a neck portion 18 and a bottom boss portion 20, neck portion 18 and boss portion 20 being diagonally disposed relative to one another. Cylindrical section 16 defines a through opening 22 that forms a fluid flow passage through the valve, through opening 22 being formed by co-axial cylindrical walls 24 and 26, cylindrical wall 26, as shown, being of a larger diameter than cylindrical wall 24. Disposed in through opening 22 is a disk-type valve element 28 having an annular radiused sealing surface 29, valve element 28 serving to control the flow of fluid through the fluid flow passage defined by through opening 22. A lower shaft 30 extends through a bore 32 in boss 20. Lower shaft 30 is rotatably journalled in bore 32 by a bearing in the well-known manner. An end cap 38 is secured to boss 20 by bolts 40, a gasket 37 forming a seal.

An upper shaft 42 extends through a bore 44 in neck portion 18. Stacked packing rings 46 received in a counterbore 48 of bore 44 serve to provide a fluid-tight seal between neck portion 18 and upper shaft 42. A packing gland 50 is also received in counterbore 48, packing gland 50 including an O-ring 52 for sealing around upper shaft 42. A gland compression bridge 54 having a central dimple 56 is received on shaft 42 by means of a bore 58 through plate 54. Bolts 60 extend through registering bores in bridge 54 and flange 64 projecting radially outwardly from neck portion 18. Nuts 66 threadedly received on bolts 60 can be tightened, as will be apparent, to engage dimple 56 with the top of packing gland 50 to compress the stack of packing rings 46 and ensure fluid-tight seal between neck 18 and shaft 42.

Lower shaft 30 is secured to disk 28 by means of a pin 68 received in a first, projecting dog 70 of disk 28. Upper shaft 42 is secured to disk 28 by means of pins 72 extending through a second, projecting dog 74 of disk 28 in a manner well known to those skilled in the art. Accordingly, disk 28 is rotatably journalled in throughway 22 of valve body 10 and can be rotated 90° manually or by means of an actuator to control fluid flow through the valve. To this end, upper shaft 42 is provided with wrench flats 76.

To effect sealing around the periphery of disk 28, them is provided an annular valve seat assembly, shown generally as 78. Valve seat assembly 78, which is described more fully in co-pending application Ser. No. 08/253,963, filed contemporaneously herewith, entitled "Valve Assembly Having Improved Valve Seat," and naming Daniel P. Kusmer and Robert A. Frenzel as inventors, includes a seal ring 80 and an annular, resilient biasing or backing member 82 to urge or bias seal ring 80 radially inward into sealing engagement with the periphery of disk 28. Valve seat assembly 78 is held in valve body 10 by means of a valve seat retainer assembly shown generally as 84 and described more fully with respect to FIGS. 3–6.

Figure 5:
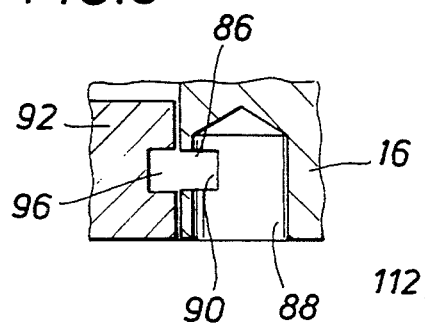
FIG. 5 is a cross-sectional view taken along the lines 5—5 of FIG. 4.

In reference to FIGS. 3–6, the seat retainer assembly is shown in greater detail. Wall 26 (see FIG. 6), which forms an annular, radially inwardly facing surface, has an annularly extending, radially inwardly facing groove 86. As best shown in FIG. 5, groove 86 is intersected by a bore 88 drilled generally axially in the valve body 10, the intersection of bore 88 and groove 86 forming an aperture 90 in the bottom of groove 86. Retainer assembly 84 includes a retainer ring 92 that has a peripheral surface 94 that is shaped and sized such that peripheral surface 94 closely faces the radially inwardly facing surface defined by wall 26 when the ring 92 is received in the valve body 10. Ring 92 also has an annularly extending radially outwardly facing groove 96, which, when ring 92 is received in valve body 10, is in register with groove 86, grooves 86 and 96 thereby defining an annularly extending channel. Ring 92 has a first side 95 provided with a notch 93 that intersects groove 96. In a manner to be described more fully hereafter, a wire member 98 is received in the annular channel formed by grooves 86 and 96 and effectively prevents any axial movement of ring 92 in valve body 10. The second side 100 of ring 92 is provided with an annularly extending, axially projecting flange 102 that forms an annular recess 103 defined by second side 100, wall 26, and flange 102. Valve body 10 includes an axially facing, annularly extending recess 104 that faces the second side 100 of ring 92 when ring 92 is received in valve body 10. It will thus be seen that a valve cavity is formed, generally defined by recesses 103 and 104. Received in the valve cavity is seat assembly 78, comprised of seat ring 80 and elastomeric backing ring 82.

Figure 3:
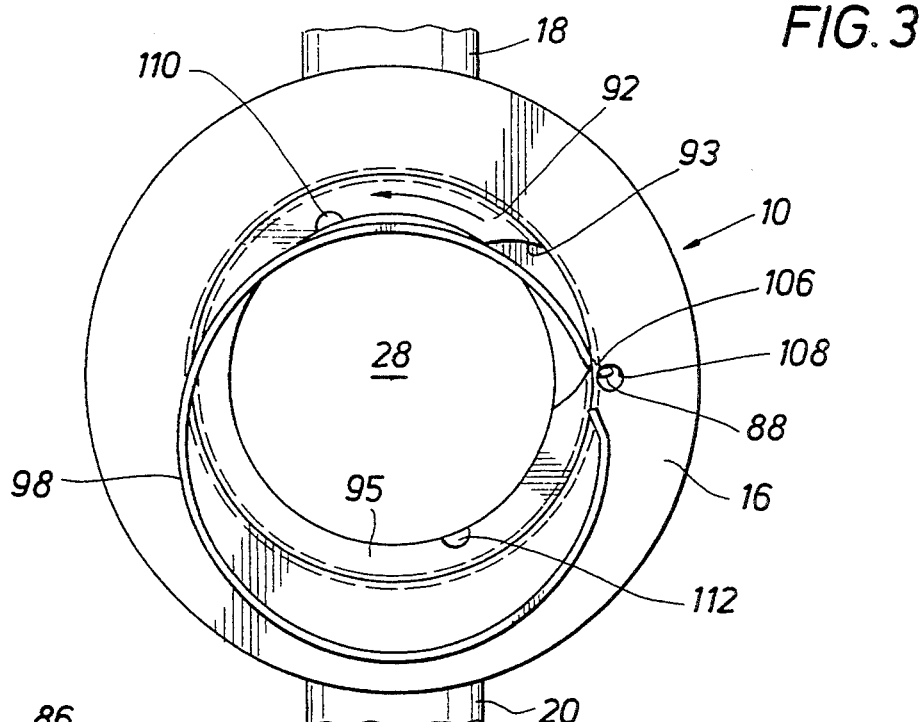
FIG. 3 is a partial, front elevational view showing the beginning of the installation of the retaining ring in the valve.
Figure 4:
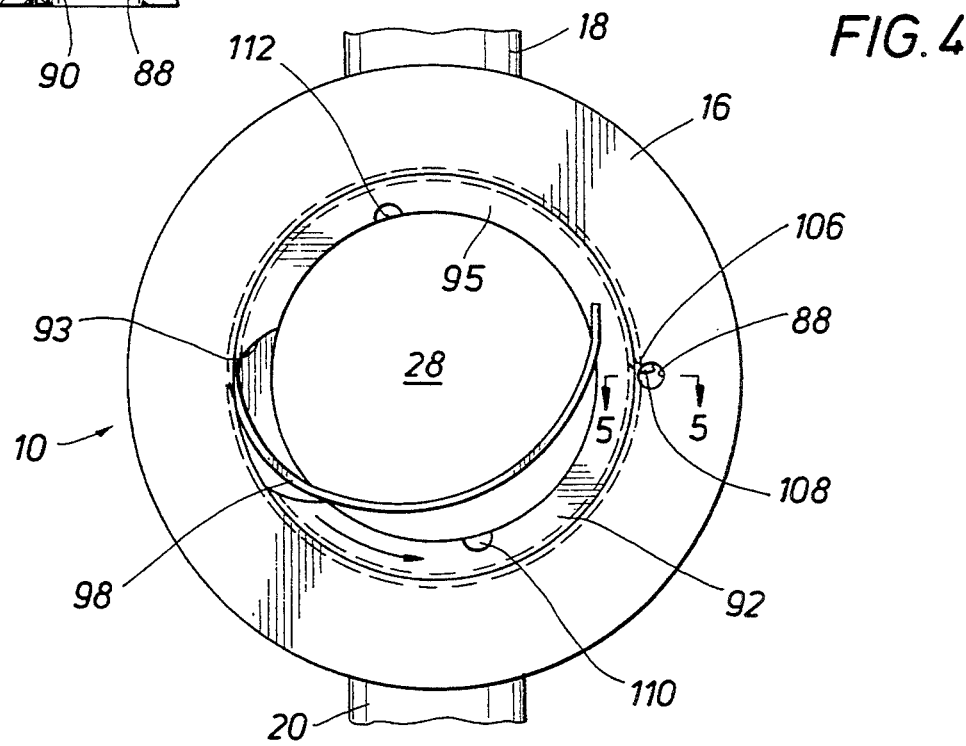
FIG. 4 is a view similar to FIG. 3 showing a further stage in the installation of the retaining ring in the valve.
Figure 6:
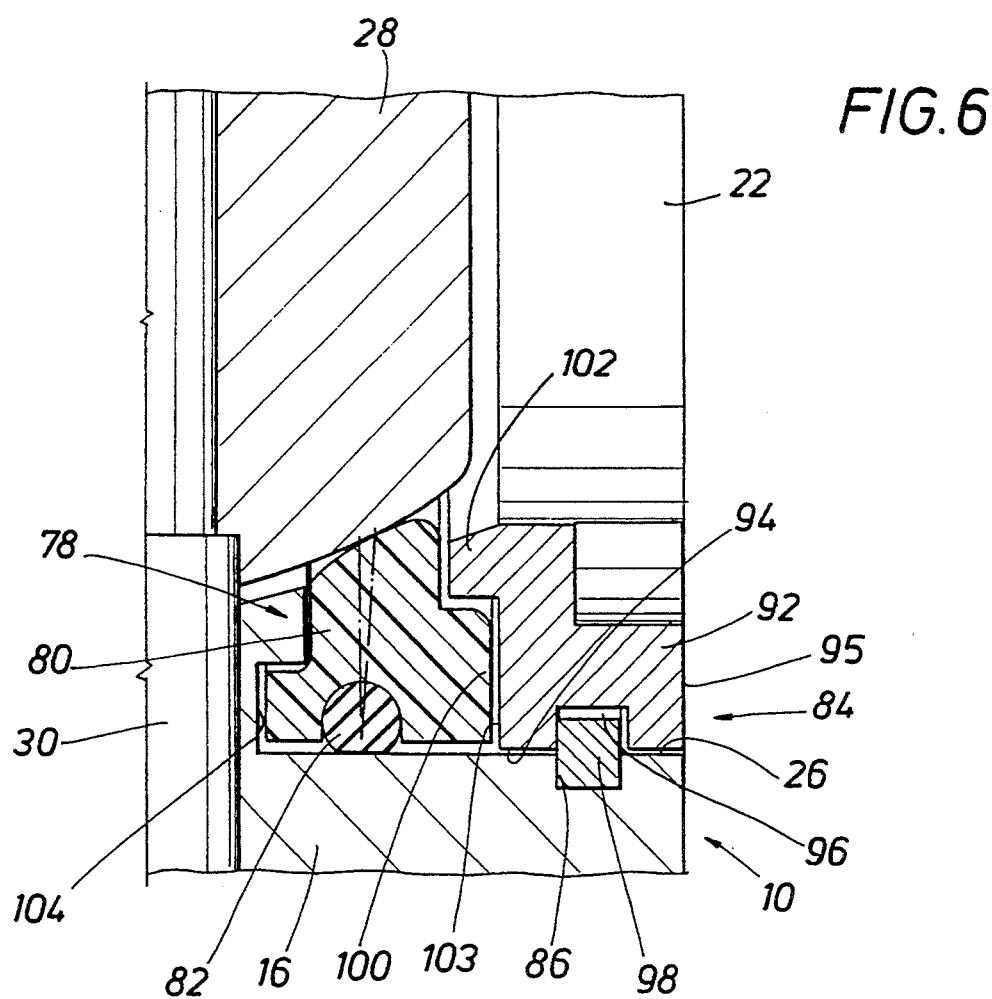
FIG. 6 is an enlarged cross-sectional view taken along the line 6—6 of FIG. 4.

Particular reference is now made to FIGS. 3 and 4 to demonstrate how retaining ring 92 is locked in valve body 10. Wire member 98 has a first end 106 that has a leg portion 108 extending generally transverse, preferably at 90°, to the long axis of wire member 98. To install ring 92 in valve body 10, ring member 92 is placed in valve body 10 such that notch 93 is in register with aperture 90, formed in valve body 10. Leg portion 108 of wire member 98 is then accessed through notch 93 and disposed in pocket 90 in valve body 10. This effectively fixes the first end 106 of wire member 98 in annular groove 86. Ring 92 is provided with diagonally disposed recesses 110 and 112, which can be engaged by a suitable tool having dual-spaced tines such that ring 92 can be rotated counterclockwise in the direction shown by the arrow. As will be seen, rotation of ring 92 in a counterclockwise direction—i.e., along the length of wire member 98 away from first end 106—will thread wire member 98 into the channel formed by grooves 96 and 86. At such point when ring 92 has been rotated to where notch 93 is again in register with pocket 90, wire member 98 will be completely disposed in the channel formed by registering grooves 86 and 96. Accordingly, retainer ring 92 will be effectively trapped in valve body 10 and prevented from any axial movement, thereby ensuring that seat assembly 78 cannot be dislodged by line pressure.

If and when seat assembly 78 requires replacement, it will be apparent that retaining ring 92 can be easily and quickly removed simply as follows: Wire member 98 has a second or free end 105 that, as shown in FIG. 3, is slightly turned radially inward. Thus, with notch 93 in register with the free end 105, free end 105 can be easily lifted out of notch 93 and ring 92 thus rotated in a clockwise direction. This effectively unthreads wire member 98 out of the channel formed by grooves 86 and 96. The seat assembly 78 then can be axially removed from valve body 10 and replaced with a new seat assembly. It can be seen that no highly specialized tools are needed to insert or remove retainer ring 92. For example, a simple piece of barstock cut to fit diagonally across ring 92 and into in notches 110 and 112 can be used to rotate retainer ring 92.

It will be apparent that other means of fixing the end 106 of wire member 98 in groove 86 can be employed. For example, screws, pins, etc., could be used to hold the end in a fixed position in the groove.

Obviously, numerous modifications and variations of the present invention are possible in light of the above teachings. It is therefore to be understood that within the scope of the appended claims, the invention may be practiced otherwise than as specifically described herein.

What is claimed is:

1. A valve comprising:
   a valve body having a through opening forming a fluid flow passage and having a wall surrounding a portion of said fluid flow passage, said wall defining an annular, radially inwardly facing surface, a first annular, radially inwardly facing groove being formed in said radially inwardly facing surface;
   a valve element rotatably mounted in said valve body;
   a ring having a peripheral surface shaped and sized such that said peripheral surface closely faces said radially inwardly facing surface of said wall when said ring is positioned within said through opening, said ring having a first, axially facing side and a second, axially facing side and a notch formed in said first side, said ring including a second, radially outwardly facing annular groove in said peripheral surface, said second annular groove intersecting said notch, said first and second annular grooves being substantially in register when said ring is positioned within said through opening whereby said first and second grooves define an annular channel;
   a wire member having a first end and a second end; and
   means to fix said first end in said first annular groove, whereby when said notch on said ring is in register with said means to fix said first end, and said first end is fixed in said first annular groove, rotation of said ring relative to said valve body in a direction away from said first end of said wire member and along the length of said wire member toward said second end of said wire member threads said wire member into said channel.

2. The valve of claim 1 wherein said valve body and said ring cooperate to form an annular valve seat cavity.

3. The valve of claim 2 wherein said second side of said ring includes an axially projecting, annular flange, and said valve body includes an axially facing, annularly extending recess, said recess facing said second side of said ring when said ring is received in said valve body, said recess and said flange on said ring cooperating to form said valve cavity.

4. The valve of claim 3 wherein an annular valve seat is received in said valve seat cavity.

5. The valve of claim 1 wherein said means to fix said first end of said wire member comprises an aperture formed in said first annular groove.

6. The valve of claim 5 wherein said first end of said wire member comprises a leg portion extending transversely to the long axis of said wire member, said leg portion being received in said aperture.

7. The valve of claim 1 wherein said valve element comprises a disk.

8. The valve of claim 1 wherein said radially inwardly facing surface is a cylindrical surface.

9. The valve of claim 1 wherein said peripheral surface is a cylindrical surface.

10. The valve of claim 1 wherein said first and second grooves are substantially rectangular in cross-section.

11. The valve of claim 1 wherein said wire member is rectangular in cross-section.

12. The valve of claim 1 wherein said ring includes first and second, diagonally disposed recesses formed in said first side, said recesses serving as engagement surfaces for insertion of a tool to permit rotation of said ring.

* * * * *